United States Patent
Schwarz (10) Patent No.: US 11,097,916 B2
(45) Date of Patent: Aug. 24, 2021

(54) SENSOR FOR DETECTING AT LEAST ONE EDGE OF A RUNNING PRODUCT WEB

(71) Applicant: Texmag GmbH Vertriebsgesellschaft, Thalwil (CH)

(72) Inventor: Norbert Schwarz, Friedberg (DE)

(73) Assignee: Texmag GmbH Vertriebsgesellschaft, Thalwil (CH)

( * ) Notice: Subject to any disclaimer, the term of this patent is extended or adjusted under 35 U.S.C. 154(b) by 379 days.

(21) Appl. No.: 16/192,857

(22) Filed: Nov. 16, 2018

(65) Prior Publication Data

US 2019/0161309 A1 May 30, 2019

(30) Foreign Application Priority Data

Nov. 24, 2017 (DE) .............. DE 10 2017 010 880.3

(51) Int. Cl.
*B65H 23/02* (2006.01)
*G01N 29/27* (2006.01)
(Continued)

(52) U.S. Cl.
CPC ..... *B65H 23/0216* (2013.01); *B65H 23/0204* (2013.01); *G01N 29/27* (2013.01);
(Continued)

(58) Field of Classification Search
CPC ............ B65H 23/0204; B65H 23/0216; B65H 2553/30; B65H 2553/41; B65H 2553/412; B65H 2553/822; G01N 2291/0237; G01N 2291/045; G01N 2291/106; G01N 29/27; G01S 13/06; G01S 15/06; G01S 17/06
See application file for complete search history.

(56) References Cited

U.S. PATENT DOCUMENTS 5,021,674 A 6/1991 Brunner
5,834,877 A 11/1998 Buisker et al.
(Continued)

FOREIGN PATENT DOCUMENTS

EP 1637877 * 3/2006

OTHER PUBLICATIONS

German Search Report for German patent application 10 2017 010 880.3, dated Aug. 10, 2018. 4 pages.
(Continued)

*Primary Examiner* — Timothy X Pham
(74) *Attorney, Agent, or Firm* — Joseph E. Maenner; Maenner & Assocaites, LLC (57) ABSTRACT

A sensor (10) is used for detecting at least one edge of at least one product web (1) running in a run direction (2). The sensor (10) has active elements (11), which are arranged adjacent to one another and are formed by transmitters (12) and receivers (13). In this case, the transmitters (12) can emit waves (14) which are received by the receivers (13). The product web (1) is provided for influencing the waves (14) in the radiation path between the transmitters (12) and receivers (13). In this case, a first (21, 31) and second (22, 32) of the active elements (11) are adjacent and have a mutual first spacing (41). The second (22, 32) and a third (23, 33) of the active elements (11) are also adjacent to one another and have a second spacing (42), which corresponds to at least 1.2 times the first spacing (41).

15 Claims, 4 Drawing Sheets

(51) Int. Cl.
  *G01S 13/06* (2006.01)
  *G01S 15/06* (2006.01)
  *G01S 17/06* (2006.01)
(52) U.S. Cl.
  CPC .............. *G01S 13/06* (2013.01); *G01S 15/06* (2013.01); *G01S 17/06* (2013.01); *B65H 2553/30* (2013.01); *B65H 2553/41* (2013.01); *B65H 2553/412* (2013.01); *B65H 2553/822* (2013.01); *G01N 2291/0237* (2013.01); *G01N 2291/045* (2013.01); *G01N 2291/106* (2013.01)

(56) References Cited

U.S. PATENT DOCUMENTS

| | | |
|---|---|---|
| 7,151,715 B2 | 12/2006 | Eisen et al. |
| 9,238,563 B2 | 1/2016 | Zwerger et al. |
| 2001/0001576 A1* | 5/2001 | Haque .................... G01D 5/342 356/429 |
| 2005/0034520 A1* | 2/2005 | Eisen ..................... G01N 29/27 73/627 |
| 2008/0289422 A1* | 11/2008 | Haque ..................... G01D 5/48 73/599 |
| 2009/0152800 A1* | 6/2009 | Nutzel .................... B65H 7/08 271/18 |
| 2011/0226061 A1 | 9/2011 | Itsumi et al. |
| 2013/0308427 A1* | 11/2013 | Zwerger ................ G01N 29/27 367/129 |

OTHER PUBLICATIONS

English translation of relevant portion of Sections D2, D3, D4 of German Search Report for German patent application 10 2017 010 880.3.

* cited by examiner

SENSOR FOR DETECTING AT LEAST ONE EDGE OF A RUNNING PRODUCT WEB

CROSS-REFERENCE TO RELATED APPLICATION

The present application claims priority to German Patent Application no: DE 10 2017 010 880.3, filed Nov. 24, 2017, which is incorporated herein by reference in its entirety.

FIELD OF THE INVENTION

The invention relates to a sensor for detecting at least one edge of at least one product web running in a run direction. In this case, the sensor has active elements which are arranged adjacent to one another in at least one detection direction extending transversely to the run direction of the at least one product web. The active elements are formed by transmitters and receivers, wherein the at least one product web is provided in the radiation path between the transmitters and receivers. The product web can influence the waves, so that by analysing the signals generated by the receivers, the location of the at least one edge of the at least one product web is determinable. The at least one edge does not necessarily have to be an outer edge. It can also separate regions of the at least one product web which influence the waves differently.

BACKGROUND OF THE INVENTION

A sensor of the type in question is known from DE 103 37 673 B3. It has piezoelectric active elements, which are used both as transmitters and also receivers. These piezoelectric elements emit ultrasonic waves, which are absorbable by a running product web. A reflector arranged beyond the product web reflects the ultrasonic waves influenced in this manner back to the piezoelectric elements, which are then used as the receiver. The piezoelectric elements are arranged in a grid, so that all have equal mutual spacing. A simple analysis of the signals received from the piezoelectric elements thus results, in order to determine the position of the edge of the running product web in this manner. This device has proven itself many times in practice and forms the starting point of the present invention.

BRIEF SUMMARY OF THE INVENTION

The invention is based on the object of providing a sensor of the type mentioned at the outset, which is distinguished by a large detection width with low hardware expenditure at the same time.

This object is achieved by the following features.

The sensor according to the invention is used for detecting at least one edge of at least one product web. The at least one product web extends in this case in a predefined run direction, wherein the at least one edge generally extends longitudinally in relation to the run direction. In order to supply the at least one running product web correctly aligned to a processing station and/or to regulate the at least one edge in its position, it is important to detect the position of the at least one edge. The term "edge" does not necessarily mean a peripheral edge of the product web here and hereafter. Any arbitrary feature of the at least one product web which differs in the influencing of the waves from other regions of the at least one product web is to be understood as an edge. An edge in this meaning could accordingly also be an applied marking which influences the waves differently, in particular reflects them. Such a marking could be printed, adhesively bonded, or embossed on. This list is merely exemplary and is not to be understood as exhaustive. It is solely important that a contrast in the waves results in the region of the edge. The sensor according to the invention is used for this purpose. It has active elements, which are arranged adjacent to one another in a detection direction. This detection direction extends substantially transversely in relation to the run direction of the at least one product web. It is not necessary in this case for the detection direction to be precisely perpendicular to the run direction. It is solely important that the detection direction does not extend parallel to the run direction, since in this case no reasonable edge position would be determinable. It is also not necessary for the active elements to be located in a line in the detection direction. It is often more favourable to arrange the active elements in a zigzag shape, in order to implement a mutual overlap of the active elements in the detection direction in this manner. This is significant above all in those cases in which the active elements have a substantially smaller emission or detection area than specified by the external geometrical dimensions thereof. A dead periphery arises in this case considered metrologically, which can be compensated for by the zigzagging arrangement. The active elements are formed by at least one transmitter and at least one receiver, which are formed by the same or by different active elements.

The at least one product web is provided in this case in the radiation path between the at least one transmitter and the at least one receiver. The at least one product path is capable in this case of influencing the waves. It is irrelevant in this case how this influencing is actually implemented in detail. For example, at least a part of the waves could be absorbed, reflected, and/or influenced in the polarization thereof by the at least one product web. It also does not play a role in this case whether the at least one receiver detects the waves reflected from the at least one product web or the at least one product web attenuates a part of the waves and the partially attenuated waves are detected. The at least one product web can be geometrically provided between the at least one transmitter and the at least one receiver. Alternatively, both can also be provided on the same side of the product web, so that the at least one product web reflects the waves or the waves are reflected by an additional reflector on the side opposite to the at least one product web. The selection of the waves is also irrelevant in principle. A first and a second of the active elements are arranged adjacent in the detection direction and have a first mutual spacing. The term "first", "second", "third", "fourth" do not necessarily mean the first, second, third, and fourth active elements in a row of active elements here and hereafter. These terms are merely used to differentiate individual active elements from a series of active elements. The term "adjacent" is to be understood here and hereafter that no further equivalent active element is provided between two adjacent active elements in the detection direction. The "spacing" of two elements or groups is understood here and hereafter as the projection of the spacing of the centres of the two elements or groups in the detection direction (centre spacing). In principle, this spacing—as is typical in the prior art—could be equal for all active elements. However, to achieve a large detection width, a very large number of active elements would then have to be provided. This not only requires a large number of active elements, but rather also a large conversion and computation expenditure in the analysis of the signals supplied by the receivers. However, this would in turn lengthen the reaction time of the sensors to position changes of the at least one edge, which results in problems which can possibly not be solved in particular in conjunction with web run controllers. However, providing more analog-to-digital converters results in an undesired high hardware demand. To solve these problems, it is proposed that different spacings be provided between the individual active elements. In particular, a second spacing between the second and a third of the active elements, which are in turn adjacent, is to correspond to at least 1.2 times the first spacing. As a result of the greater second spacing of the active elements, a greater detection width of the entire sensor necessarily results, without requiring more active elements. To further enlarge the detection width, the second spacing can also correspond to at least 1.3, 1.4, 1.5, 1.6, 1.7, 1.8, 1.9, 2.0, 2.1, 2.2, 2.3, 2.4, 2.5, 2.6, 2.7, 2.8, 2.9, or 3 times the first spacing. It has been shown that this measure nonetheless does not negatively influence the resolution of the sensor as a whole. It merely has to be ensured that not only the active elements in the region of the position of the at least one edge, but rather further active elements in the surroundings of the edge are taken into consideration. This does not result in a higher computing expenditure, since all active elements initially have to be analysed in any case to determine the position of the edge. Radiation paths intersecting one another in the detection direction are preferably also taken into consideration in this case. For this purpose, it merely has to be ensured that the smaller first spacing is not selected as excessively large. However, this is dependent on various factors, in particular the width of the active elements. Therefore, a detection gap between the active elements can be covered by paths to non-opposing active elements. It has been shown that the number of the active elements can be substantially reduced in this manner. In particular, the second spacing between the second and the third elements can be increased up to 2 times the first spacing, without having to accept resolution losses in the form of detection gaps. A more cost-effective construction having few active elements with high detection width and low computing expenditure thus results. To further increase the detection width of the sensor, it is advantageous if a fourth active element is adjacent to the third active element, wherein a mutual third spacing between the third and the fourth active elements in the detection direction corresponds to at most 1.1 times, preferably at most 1.05 times the first spacing. In this manner, on both sides of a larger gap between the active elements, active elements located close to one another are located in each case. The active elements located close to one another, namely the first and second and also the third and fourth active elements, see the at least one product web from slightly different observation angles, so that in this manner the gap between the second and the third active elements can be bridged very effectively.

The first and the second and also the third and the fourth of the active elements each form a group, the spacing of which in the detection direction corresponds to at least 2.2 times the first spacing. The spacing of the groups preferably corresponds to at least 2.3, 2.4, 2.5, 2.6, 2.7, 2.8, 2.9, or 3 times the first spacing. It is not necessary in this case to construct each of the groups geometrically identically. Rather, it is sufficient to implement the groups within the above-described limits of the active elements. The "spacing between two groups" is to be understood as the spacing which exists in the detection direction between the centres of both groups.

Arbitrary groups can in turn be combined into higher-order groups. To increase the detection width of the sensor, it is provided in this case that the mutual spacing between these higher-order groups corresponds to at least 2.2 times the spacing of the groups of the respective lower order. The spacing of these groups preferably corresponds to at least 2.3, 2.4, 2.5, 2.6, 2.7, 2.8, 2.9, or 3 times the spacing of the groups of the respective lower order.

The above-mentioned condition for the arrangement of groups made of groups can be iteratively applied by groups being combined into higher-order groups, which in turn have a correspondingly larger mutual spacing. In this case, the minimum spacing between the higher-order groups is always at least 2.2 times greater than the spacing of the groups of the order underneath. The spacing of these groups preferably corresponds to at least 2.3, 2.4, 2.5, 2.6, 2.7, 2.8, 2.9, or 3 times the spacing of the groups of the order underneath.

In order to detect the at least one product web continuously in the detection direction, the first spacing between the first and the second active elements is at most equal to twice the mean value of the widths of the first and second active elements. In this case, the at least one transmitter can emit waves over a width oriented in the detection direction, which the at least one receiver can receive over a width oriented in the detection direction. The concept of the "width" in conjunction with the active elements is to be understood as the width within which the corresponding transmitter or receiver can emit or receive, respectively, metrologically relevant waves. If a transmitter or receiver can only emit very low wave powers per spatial angle in the outermost peripheral region or can only still convert the received waves into a very small measurement signal, respectively, so that an unfavourable or no longer acceptable signal-to-noise ratio results, this range is thus not included in the "width".

In principle, the active elements can have different widths. However, this results in a more complex analysis of the signals. For this reason, it is advantageous if the transmitters and/or receivers each have equal widths.

In one particularly advantageous embodiment of the subject matter of the invention, the widths of all active elements are equal.

In principle, only one transmitter and multiple receivers or only one receiver and multiple transmitters could be provided. In one advantageous embodiment, however, precisely one receiver is opposite to each transmitter. In this manner, an optimum angle resolution results, so that relatively large gaps can be left between specific active elements. This enlarges the detection width of the sensor.

To further simplify the analysis of the signals received by the receivers, it is advantageous if at least a part of the active elements—viewed in the detection direction—is arranged in a grid. Therefore, each of the active elements has a position which may be computed as an integer multiple of a grid length. In consideration of the above-described properties of the sensor, it is understandable that in the grid-type arrangement, an active element cannot also actually be associated with each integer within an interval. Rather, various possible grid points remain empty.

To achieve a maximum detection width of the sensor, is expedient if at least a part of the active elements has an arrangement corresponding to a terminated Cantor set. A Cantor set can be constructed in the following manner:

One starts with a closed interval, for example [0,1]. The open, middle third or less is removed from this interval, so that two intervals of the form [0,1/3] and [2/3,1] or more remain left over. This procedure is to be repeated infinitely often in principle, and therefore the Cantor set has an infinite number of isolated points. In a terminated Cantor set, in contrast, the above-described iteration process is only to be carried out over a finite number of steps, so that a finite number of intervals remains left over at the end. One of the active elements is then located in the centre of each of these intervals to implement an arrangement corresponding to a terminated Cantor set.

Electromagnetic waves have proven themselves for the waves. In this case, the frequency is freely selectable. Radio waves or waves in the optical and/or infrared range are preferably used. However, this is not to be understood as restrictive.

Alternatively, sound waves can also be used, in particular if the at least one running product web may not be reasonably scanned optically, because it would not influence the waves in any manner, for example.

In particular in the case of sound waves, it is advantageous if at least one of the active elements is transmitter and receiver. In this case, the at least one active element is preferably designed in the form of a piezocrystal, which emits sound waves and can detect optimally as a result of the necessarily existing resonance effect. Since sound waves propagate relatively slowly in relation to electromagnetic waves, any interference from the transmission of the waves can be eliminated by dead time suppression.

The sensor is intended in principle to detect at least one edge in the detection direction, in order to determine the position of the at least one edge in this manner. Alternatively or additionally, however, a position determination transversely to the detection direction can also be performed, in order to ascertain the position of the at least one product web perpendicularly to the product web level in this manner. This value is significant in particular as a correction term for the edge length.

BRIEF DESCRIPTION OF DRAWINGS

Other advantages and characteristics of this invention will be explained in the detailed description below with reference to the associated figures that contain several embodiments of this invention. It should however be understood, that the figure is just used to illustrate the invention and does not limit the scope of protection of the invention.

DETAILED DESCRIPTION OF THE INVENTION

Figure 1:
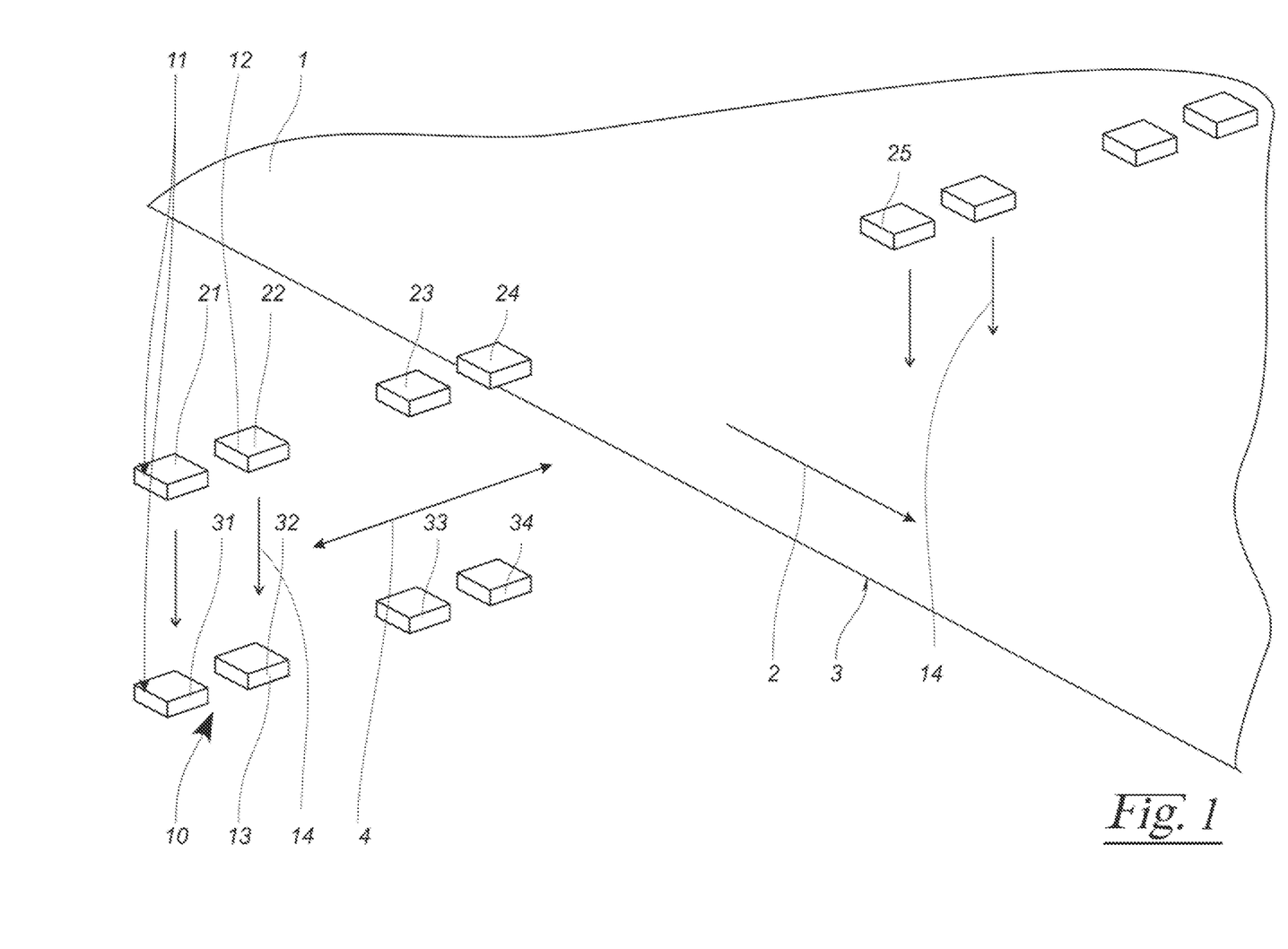
FIG. 1 shows a three-dimensional schematic illustration of a first embodiment of the subject matter of the invention.

FIG. 1 shows a three-dimensional schematic illustration of a first embodiment of the subject matter of the invention. A product web 1 moves along a run direction 2 and has an edge 3. The position of the edge 3 in a detection direction 4 extending perpendicular to the run direction 2 is detected by a sensor 10.

The sensor 10 has a plurality of active elements 11, of which some are formed as transmitters 12 and others as receivers 13. The transmitters 12 can emit waves 14, in particular in the form of light, while the receivers 13 can receive these waves 14 and convert them into an electrical signal. If the product web 1 is located between a transmitter 12 and a receiver 13, the waves 14 are thus shaded by the product web 1, whereby the position of the edge 3 of the product web 1 can be roughly ascertained. In addition, the electrical signal generated by the receiver 13 is also analysed similarly in its signal level. It is to be taken into consideration in this case that the detected signal becomes less the more the product web 1 covers the radiation path between the transmitter 12 and the receiver 13. In this manner, the sensor 10 can detect the position of the edge 3 of the product web 1 with high spatial resolution, which is in particular substantially more accurate than the points defined by the individual active elements 11.

In this case, the sensor 10 not only analyses the direct radiation paths from a transmitter 12 to the opposing receiver 13, rather radiation paths to various receivers 13 are also taken into consideration.

In the arrangement according to FIG. 1, all transmitters 12 are located on one side of the product web 1 and all receivers 13 on the opposing side. The known forked arrangement therefore results. However, this is not the only possible arrangement.

Figure 2:
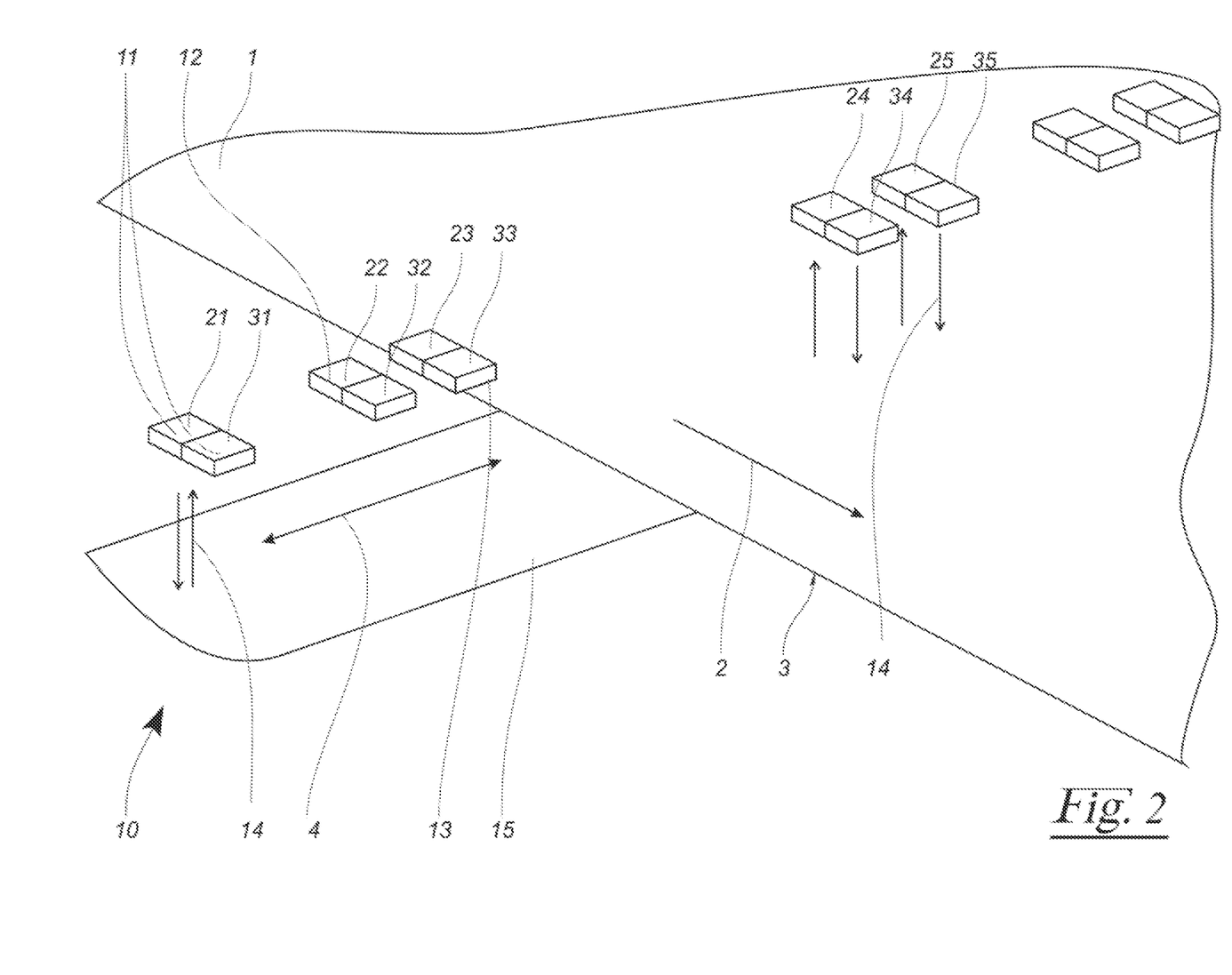
FIG. 2 shows a three-dimensional schematic illustration of a second embodiment of the subject matter of the invention.

FIG. 2 shows an alternative embodiment, wherein identical reference signs identify identical parts. Only the differences from the embodiment according to FIG. 1 will be described hereafter. In the embodiment according to FIG. 2, the transmitters 12 and receivers 13 are located on the same side of the product web 1. In this case, the receivers 13 detect the waves 14 reflected by the product web 1. The same effects also result in this case as in the embodiment according to FIG. 1. The essential difference is only that now each receiver 13 generates a corresponding electrical signal precisely when the product web 1 is located in the radiation path between the transmitter 12 and the receiver 13.

In the embodiment according to FIG. 2, an optional reflector 15 is also shown, which is used in particular in the case of product webs 1 which are nonreflective or only poorly reflective. This reflector 15 ensures a reflection of the waves 14 if the radiation path is not covered by the product web 1.

Figure 3:
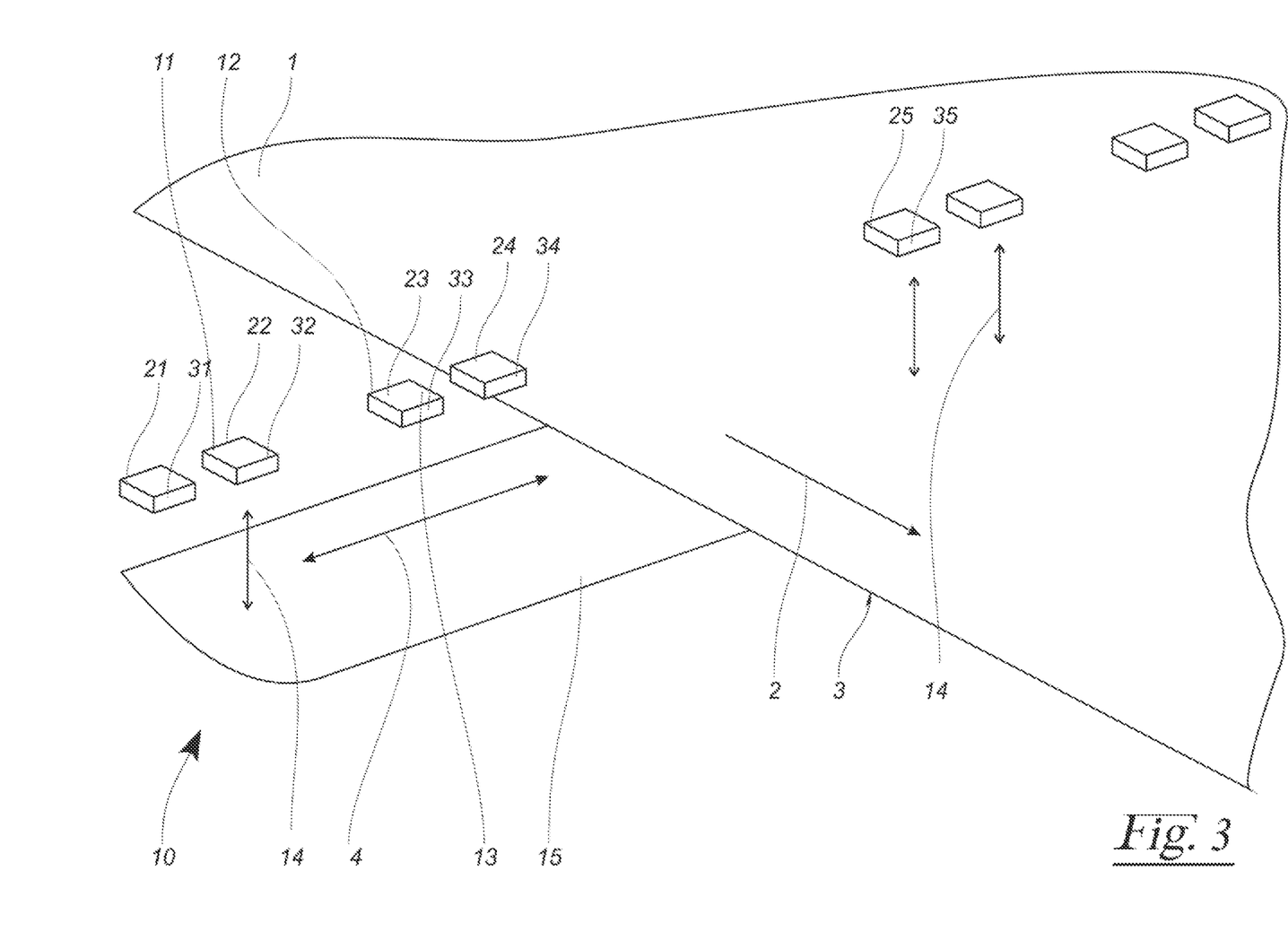
FIG. 3 shows a three-dimensional schematic illustration of a third embodiment of the subject matter of the invention.

FIG. 3 shows a further alternative embodiment according to FIG. 2, wherein identical reference signs again identify identical parts. Only the differences from the embodiment according to FIG. 2 will again be described hereafter.

In the embodiment according to FIG. 3, each active element 11 has a double function and is transmitter 12 and receiver 13 simultaneously. This measure is advantageous in particular if the waves 14 are ultrasonic waves.

Figures 4, 5:
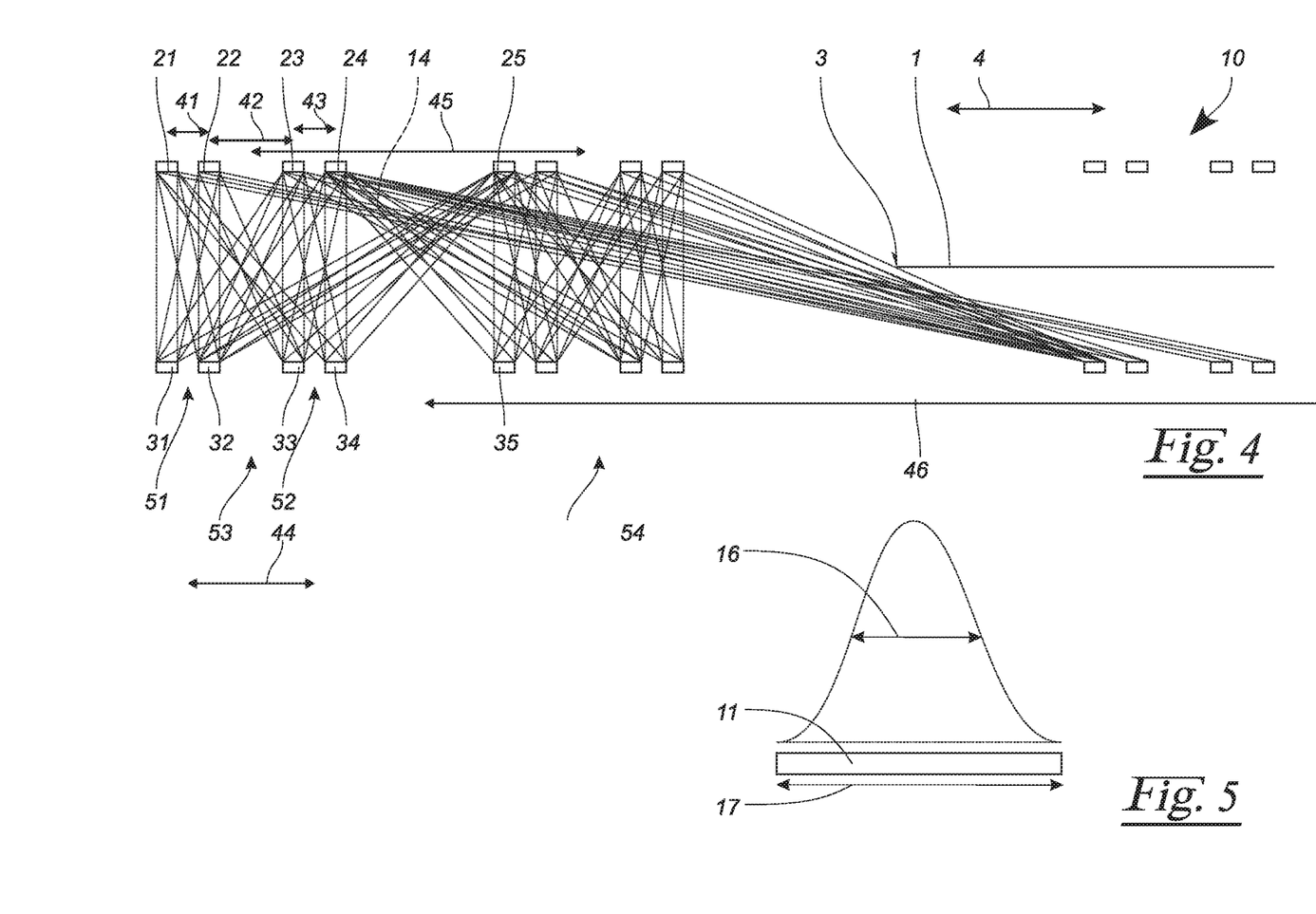
FIG. 4 shows a view of the subject matter of the invention according to FIG. 1 in the direction of the detection direction.
FIG. 5 shows a diagram.

The more detailed explanation of the functionality of the sensor 10 will be performed on the basis of the illustration according to FIG. 4. This illustration corresponds to a view of the sensor 10 according to FIG. 1 in the direction of the run direction 2, so that the detection direction 4 is a horizontal line in the plane of the drawing in FIG. 4. To differentiate the individual active elements 11, these are numbered hereafter. In this case, "first" does not necessarily stand for the first active element 11 in the series of active elements 11. Rather, the assignment is arbitrary. The numbering of the active elements 11 is performed, however, such that adjacent active elements 11 also receive adjacent ordinal numbers. The upper active elements 11 are always the transmitters 12 in this case, while the lower active elements 11 are the receivers 13.

If one considers a first transmitter 21, it can thus be seen that a sensitive analysis of the edge position of the product web 1 is only possible in principle in a region which is located within the widths 16 between the first transmitter 21 and a first receiver 31. After a second transmitter 22 has been attached at a first spacing 41 in relation to the first transmitter 21, which corresponds to at most twice the mean value of the widths 16, a gap results between the first transmitter 21 and the second transmitter 22, which is not metrologically detectable by the first transmitter 21 and first receiver 31 or by the second transmitter 22 and second receiver 32. This gap is closed in that the first transmitter 21 is also analysed by the second receiver 32. Alternatively or additionally, the second transmitter 22 can also be analysed by the first receiver 31. It can be seen that the above-described gap in the detection range is closed by this measure. However, this only functions if the first spacing 41 is not greater than twice the mean value of the widths 16 of the mentioned elements 11.

The first and second transmitters 21, 22 and the first and second receivers 31, 32 are considered hereafter as a group 51. A substantially identically constructed group 52 consists of a third transmitter 23 and a fourth transmitter 24, and also a third receiver 33 and a fourth receiver 34, which are arranged in a mutual third spacing 43, which substantially corresponds to the first spacing 41. The second and third transmitters 22, 23 are arranged at a substantially greater second spacing 42 from one another, however. A correspondingly enlarged gap thus results between the two groups 51, 52, which is not directly detectable by the active elements 11.

However, it can be seen that this gap can be closed by mutual analysis of the individual transmitters 12 and receivers 13. The gap region adjoining the second transmitter 22 is covered, for example, by analysing the first receiver 31 with switched-on third transmitter 23. Alternatively or additionally, the first transmitter 21 could also be used together with the third receiver 33. The next gap region is covered by the pairing of third transmitter 23 and second receiver 32. Alternatively or additionally, the second transmitter 22 and the third receiver 33 can in turn be used here. The last region of the gap is finally covered by the second transmitter 22 and the fourth receiver 34. Alternatively, the fourth transmitter 24 and the second receiver 32 can in turn be used here. In this manner, the entire gap between the two groups 51, 52 is covered, if the second spacing 42 is not greater than 2 times the first spacing 41. The gap between the third transmitter 23 and the fourth transmitter 24 is covered in the same manner as between the first transmitter 21 and the second transmitter 22.

The groups 51, 52 in turn form a group 53, which is followed by a further group 54. A fifth transmitter 25 and a fifth receiver 35 are provided in this group 54, wherein the groups 53, 54 have a fifth spacing 45, which corresponds in particular to 9 times the first spacing 41. Further active elements 11 adjoin this fifth transmitter 25 in the same manner as the above-described arrangement. The gap in the fifth spacing 45 is also covered in a corresponding manner by reciprocal usage of transmitters 12 and receivers 13.

This arrangement can be expanded arbitrarily in principle, so that the groups defined according to the above design principle are always placed in pairs adjacent to one another and the spacing between these groups is enlarged with each group order by at least the factor 2.2, at most the factor 4.0, in particular the factor 3.0. A Cantor arrangement thus results, which represents the limit value for a continuous analysis ability of the entire measurement range. This is indicated in FIG. 4, by a further group following on the right adjacent to the described arrangement, which is provided at a sixth spacing 46. This Cantor arrangement cannot be continued arbitrarily, however, since the transmitters 12 generally can only emit in a restricted angle range and the receivers 13 also can only receive waves from a restricted angle range. Therefore, a mathematically exact Cantor arrangement cannot be implemented. The design principle—as described above—has to be terminated at a specific point. If this is not sufficient for the desired detection width, multiple of these terminated Cantor arrangements thus have to be placed adjacent to one another, without further increasing the mutual spacing.

As can be inferred from the above statements, a substantial reduction of active elements 11 results due to this arrangement, so that either fewer active elements 11 have to be installed or the existing active elements 11 can be distributed over a larger detection region. In the plane of the product web 1, no gaps result in the detection region due to the novel arrangement of the active elements 11. Such gaps only arise in the vicinity of the plane of the active elements 11, which does not play a role for the position detection of the product web 1, however.

The transmitters 12 have widths 16, over which they can emit waves 14 having relevant power. The receivers 13 can convert the waves 14 into a metrologically relevant electrical signal over the width 16. This substantive matter is illustrated in the diagram shown on the bottom according to FIG. 5. This diagram shows the emission characteristic of the transmitter 12 as a function of the location in the transmitter 12. The transmitter 12 has a component width 17 in this case. However, it can be seen from the emission characteristics that the transmitter 12 no longer has a metrologically relevant emission intensity in the peripheral regions, because an unacceptable signal-to-noise ratio results in the peripheral regions. In this case, the width 16 of the transmitter 12 is determined by the flanks of the emission characteristic. The way in which the width 16 is specifically defined only plays a subordinate role for the subject matter of the invention. For example, the inflection point of the emission characteristic could be used as the limit for the width 16. Alternatively, for example, a specific ratio between the local emission characteristic and the emission characteristic in the peak could also be used, for example, the halving point or the 1/e point of the emission characteristic. The same consideration is also applied for the receiver 13, wherein instead of the emission characteristic, the ratio between the electrical signal generated by the receiver 13 and the incident wave power is used therein. If the active elements 11 are equipped with means which influence the waves 14, for example, lenses, diffusers, or diffraction apertures, these means are thus to be taken into consideration in the width determination.

Since some of the embodiments of this invention are not shown or described, it should be understood that a great number of changes and modifications of these embodiments is conceivable without departing from the rationale and scope of protection of the invention as defined by the claims.

What is claimed is:

1. A sensor for detecting at least one product web, said at least one product web having at least one edge and a run direction, said at least one product web running in said run direction, wherein said sensor having at least one detection direction extending transversely to said run direction of said at least one product web, and said sensor has active elements, which are arranged adjacent to one another in said detection direction and said active elements are formed by transmitters and receivers, wherein said transmitters can emit waves and said receivers can receive said waves, said waves having a radiation path and propagating in said radiation path from said transmitters to said receivers and said at least one product web is provided for influencing said waves in said radiation path between said transmitters and said receivers, wherein a first and a second of said active elements are adjacent in said detection direction, said second and a third of said active elements are adjacent in said detection direction, said third and a fourth of said active elements are adjacent in said detection direction, said first and said second of said active elements have a first mutual spacing from each other in the detection direction, said second and said third of said active elements have a second mutual spacing from each other in the detection direction, which corresponds to at least 1.2 times said first spacing, and said third and said fourth of said active elements have a mutual third spacing from each other, which corresponds to at most 1.1 times the first spacing, said first and said second of said active elements form a first group, and said third and said fourth of said active elements form a second group, wherein said first and said second group have a fourth spacing from each other, which corresponds to at least 2.2 times the first spacing.

2. The sensor according to claim 1, wherein said first and second groups form higher-order groups of groups having a mutual fifth spacing, which corresponds to at least 2.2 times said spacing of said first and second groups.

3. The sensor according to claim 2, wherein in claim 2 is iteratively applicable, by groups being assembled into higher-order groups, which in turn have a mutual spacing which corresponds to at least 2.2 times said spacing of said groups of the order underneath.

4. The sensor according to claim 1 wherein said at least one of said active element has a width, which corresponds to at least half of said first spacing.

5. The sensor according to claim 4, wherein said widths of said transmitters are equal.

6. The sensor according to claim 4, wherein said widths of said receivers are equal.

7. The sensor according to claim 4, wherein said widths of said active elements are equal.

8. The sensor according to claim 4, wherein said transmitters and said receivers are located opposite to each other in each case.

9. The sensor according to claim 1, wherein at least a part of said active elements are arranged in a grid, viewed in the detection direction.

10. The sensor according to claim 1, wherein at least a part of said active elements has an arrangement corresponding to a terminated Cantor set.

11. The sensor according to claim 1, wherein said waves are electromagnetic waves.

12. The sensor according to claim 1, wherein said waves are soundwaves.

13. The sensor according to claim 1, wherein at least one of said active elements is said transmitter and said receiver.

14. The sensor according to claim 1, wherein said sensor can detect said at least one edge in said detection direction.

15. The sensor according to claim 1, wherein said sensor can detect said at least one edge transversely to said detection direction.

* * * * *